United States Patent Office 3,509,706
Patented May 5, 1970

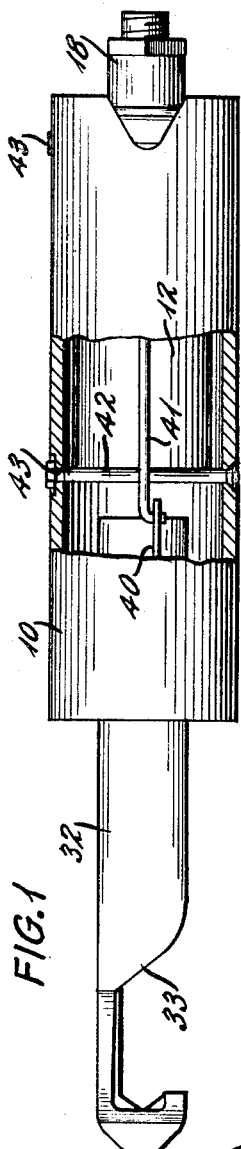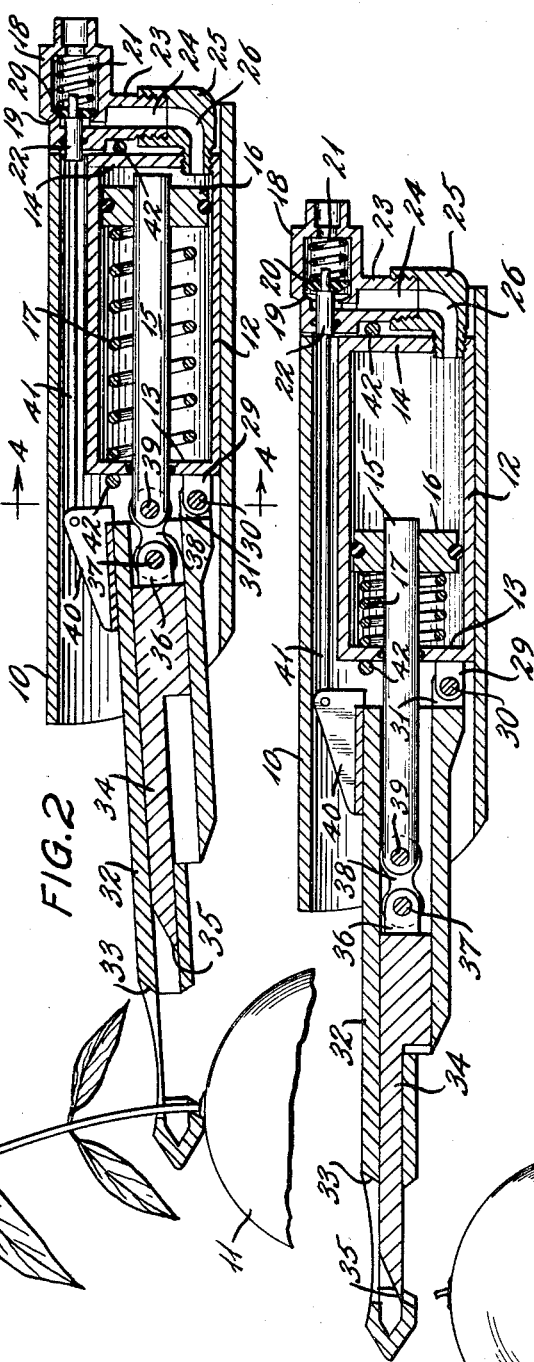
INVENTORS
JOHN B. McCUTCHEON
JAMES R. POWELL
ATTORNEYS

3,509,706
AUTOMATIC FRUIT PICKER
John B. McCutcheon, 1033 Marjorie St., and James R. Powell, 314 Tuscarora St., both of Lakeland, Fla. 33801
Filed Oct. 2, 1968, Ser. No. 764,475
Int. Cl. A01g *19/08*
U.S. Cl. 56—338                        4 Claims

ABSTRACT OF THE DISCLOSURE

Automatically operated fruit picking apparatus having both an inner and outer housing portion. The inner housing embraces a blade which is slidably mounted therein and actuated by a spring-biased piston, fluidically controlled. When a valve is opened, fluid fills the piston chamber of the outer housing causing the knife to slide forward and sever the fruit from the stem.

BACKGROUND OF THE INVENTION

Field of the invention

The present invention relates generally to the severing or cutting of various articles and relates particularly to the harvesting of fruit and the separation of fruit from the tree.

Description of the prior art

Many mechanical devices have been provided in the past to aid man in the removal of fruit from trees, particularly fruit that is not easily reached. Most of the prior art has had at least one movable blade which was controlled by a cable or linkage which was actuated when the operator desired. Some efforts have been made to produce a blade which actuated automatically by the weight of the fruit; however, these devices have been heavy and unwieldy and the automatically actuating device has not always functioned properly since the weight of the fruit varies.

SUMMARY OF THE INVENTION

The present invention is an automatic fruit picker having a body with a reciprocating blade movably mounted therein and such blade is automatically movable by fluid under pressure. A portion of the body is disposed at a slight angle to the remainder of the body and such portion is adapted to engage fruit in such a manner that when a slight pull is imparted to the body the angular portion will be aligned with the remainder of the body and the movement of such portion will open a valve to permit fluid under pressure to be introduced into the body to move the blade outwardly to sever the stem of the fruit so that the fruit will fall by gravity.

BRIEF DESCRIPTION OF THE DRAWING

FIG. 1 is a top plan view of the device with portions broken away for clarity.

FIG. 2 is a vertical section of the structure of FIG. 1 illustrating the cutter blade in retracted position.

FIG. 3 is a section similar to FIG. 2 illustrating the cutter blade in extended position, and FIG. 4 is a section on the line 4—4 of FIG. 2.

DESCRIPTION OF THE PREFERRED EMBODIMENT

With continued reference to the drawing, a generally cylindrical body 10 is provided which may be either held in the hand of the operator or attached to an elongated handle or pole (not shown) so that the device can be used on fruit or the like 11 which is above the reach of an operator on the ground.

Located within the body 10 is a fluid cylinder 12 having ends 13 and 14. A piston rod 15 having a piston 16 fixed to one end is carried within the cylinder 12 and the piston rod 15 extends through the end 13 to the exterior of the cylinder. A return spring 17 is located within the cylinder between the end 13 and the piston 16 so that when fluid under pressure is introduced into the cylinder the piston will be moved against the tension of the spring 17 and when the fluid pressure is relieved the spring 17 will return the piston to its initial position.

In order to introduce air or other fluid under pressure into the cylinder 12, a valve housing 18 is provided having a valve seat 19 against which a valve 20 is adapted to be seated by a spring 21. The valve preferably is mounted on a plunger 22 which is movable lengthwise to permit fluid under pressure to bypass the valve 20. The valve housing 18 has a depending leg 23 with a passageway 24 therein. The leg 23 is threadedly connected to an L-shaped fitting 25 with a passageway 26 extending therethrough. The fitting 25 is threadedly connected to the end 14 of the fluid cylinder 12 to provide communication between a source of fluid under pressure (not shown) and the interior of the fluid cylinder 12. When the valve 20 is unseated, fluid under pressure will flow through the valve housing 18, through the passageways 24 and 26 and into the cylinder 12.

A lug 29 projects outwardly from the end 13 of the fluid cylinder and such lug is connected by a pivot pin 30 to ears 31 fixed to one end of a blade housing 32. The outer end of the blade housing has a cut-out portion 33 providing a hook for the reception of the stem of the fruit 11. Within the blade housing 32 a blade 34 having a cutting edge 35 at one end is slidably mounted. In order to cause reciprocation of the blade 34, such blade is provided with a pair of lugs 36 on the end opposite the cutting edge 35, and such lugs are connected by a pivot pin 37 to one end of a connecting link 38 and the opposite end of such link is connected by a pivot pin 39 to the end of the piston rod 15. A bracket 40 is mounted on the blade housing 22 and such bracket is pivotally attached to one end of a connecting rod 41, the opposite end of which is connected to the plunger 22.

The fluid cylinder 12 is removably mounted within the body 10 in any desired manner, as by screws 42 extending from side to side of the body 10 between the blade housing 32 and the forward end of the cylinder 12 and between the rear end of the cylinder 12 and the valve housing 18. The screws are held in fixed position by nuts 43. The screws 42 are located in close proximity to opposite ends of the cylinder 12 to restrict lengthwise movement thereof within the body 10.

In the operation of the device the blade housing 32 is pivotally connected to the lug 29 and normally is disposed at a slight angle with the blade 34 in retracted position and the valve 20 in engagement with the valve seat 19. The operator then positions the device so that the stem of the fruit 11 is located within the cut-out portion 33 and with the lower portion of the blade housing 32 in engagement with the fruit. A slight downward pressure is applied by the operator to the fruit and such downward pressure will cause the blade housing 32 to pivot about the pin 30 so that the blade housing moves to a position substantially co-extensive with the cylinder 12. When the blade housing is rotated the bracket 40 will move the connecting rod 41 rearwardly so that the plunger 22 will unseat the valve 20 and permit fluid under pressure to pass through the passageways 24 and 26 into the cylinder 12. Such fluid under pressure will extend the piston rod 15 the outer end of which is connected by the link 38 to the blade 34 and will cause such blade to be extended until the cutting edge 35 severs the fruit 11 from the stem. As soon as the fruit and the stem are separated, the pressure on the blade housing 32 will be relieved and the spring 21 will urge the valve 20 into engagement with the valve seat 19 and cut off the supply of fluid under pressure to the cylinder 12 and simultaneously return the blade housing to its initial angular position. Thereafter the return spring 17 will retract the piston rod 15 and the blade 34 to their initial positions.

We claim:

1. An automatic fruit picker comprising a body, fluid cylinder means having a piston rod mounted within said body, valve means connecting said cylinder means to a source of fluid under pressure, a blade housing swingably mounted on one end of said cylinder means and normally disposed at an angle thereto, a blade slidably mounted within said housing and pivotally connected to the piston rod of said cylinder means, and connecting rod means connecting said blade housing and said valve means, whereby when said blade housing is swung to a position substantially co-extensive with said cylinder means the valve means will be open to introduce fluid under pressure into said cylinder means and extend said blade.

2. The structure of claim 1 including connecting link means connecting said blade and said piston rod.

3. The structure of claim 1 including a return spring within said cylinder means for retracting said blade after the fluid under pressure has been relieved.

4. An automatic fruit picker comprising a generally cylindrical body, a fluid cylinder removably mounted within said body, said fluid cylinder having a piston rod extending from one end thereof, a valve housing connected to the opposite end of said cylinder, said valve housing having a valve and a valve seat, spring means urging said valve into intimate engagement with said valve seat, said valve housing being connected to a source of fluid under pressure and permitting fluid under pressure to flow into said cylinder when said valve is unseated for extending said piston rod, a return spring within said cylinder for retracting said piston rod when the fluid under pressure is relieved, a blade housing swingably mounted on one end of said cylinder and normally disposed at an angle thereto, a cutter blade slidably mounted within said blade housing, link means pivotally connecting said blade and said piston rod, said blade housing having a cut-out portion across the path of travel of said blade and adapted to receive an article to be cut, a bracket mounted on said blade housing, a connecting rod swingably connected at one end to said bracket, said valve being fixed to the opposite end of said connecting rod, whereby when said blade housing is swung to a position substantially co-extensive with said cylinder the connecting rod will unseat said valve and permit fluid under pressure to flow into said cylinder and cause said piston rod and blade to be extended for cutting material within said cut-out portion.

References Cited

UNITED STATES PATENTS

| | | | |
|---|---|---|---|
| 720,706 | 2/1903 | Lamb | 56—328 |
| 2,385,419 | 9/1945 | Matulich | 30—180 |
| 3,008,234 | 11/1961 | Mattera | 30—228 |
| 3,041,725 | 7/1962 | Harries | 30—180 |
| 3,438,129 | 4/1969 | Spangler | 30—180 |

LOUIS G. MANCENE, Primary Examiner

J. N. ESKOVITZ, Assistant Examiner

U.S. Cl. X.R.

30—180